(12) United States Patent
Keeney et al.

(10) Patent No.: US 6,189,198 B1
(45) Date of Patent: Feb. 20, 2001

(54) METHOD OF MAKING A VANISHING WARP CARRIER SEAL

(75) Inventors: John D. Keeney, Fremont; David A. Castle, Epping, both of NH (US)

(73) Assignee: Kingston-Warren Corporation, Farmington Hills, MI (US)

( * ) Notice: Under 35 U.S.C. 154(b), the term of this patent shall be extended for 0 days.

(21) Appl. No.: 09/383,840

(22) Filed: Aug. 26, 1999

(51) Int. Cl.$^7$ ................................. B23P 17/00; E06B 7/16

(52) U.S. Cl. .................. 29/527.4; 49/490.1; 264/171.16; 264/210.2

(58) Field of Search ................................. 29/527.1, 527.4; 49/479.1, 490.1; 264/148, 171.16, 210.2

(56) References Cited

U.S. PATENT DOCUMENTS 4,343,845 * 8/1982 Burden et al. ...................... 49/490.1

* cited by examiner

Primary Examiner—P. W. Echols
(74) Attorney, Agent, or Firm—Dykema Gossett PLLC

(57) ABSTRACT

A process for creating a seal having a first linear portion and a second curved portion joined thereto is provided. The process includes providing a retaining section including a threaded metal wire with warp fiber disposed therein, forming the carrier section into a predetermined cross-sectional shape using forming rolls, extruding a polymeric material around the carrier section and generating a contacting member onto said carrier section to form a seal, heating the seal within an oven to cure the polymeric material and to break down the warp fiber so that the seal is readily bendable, and heating then cooling the second portion of the seal in a forming device for predetermined times at predetermined temperatures to cause the second portion of the seal to be formed in a curved manner.

14 Claims, 2 Drawing Sheets

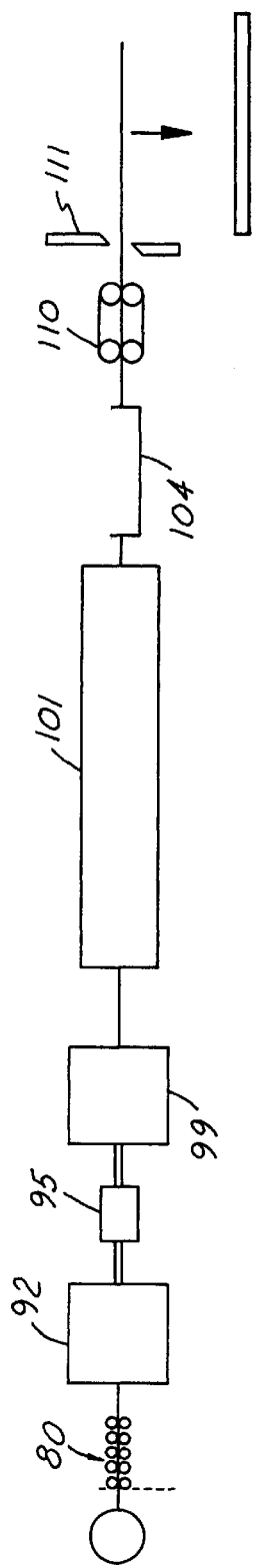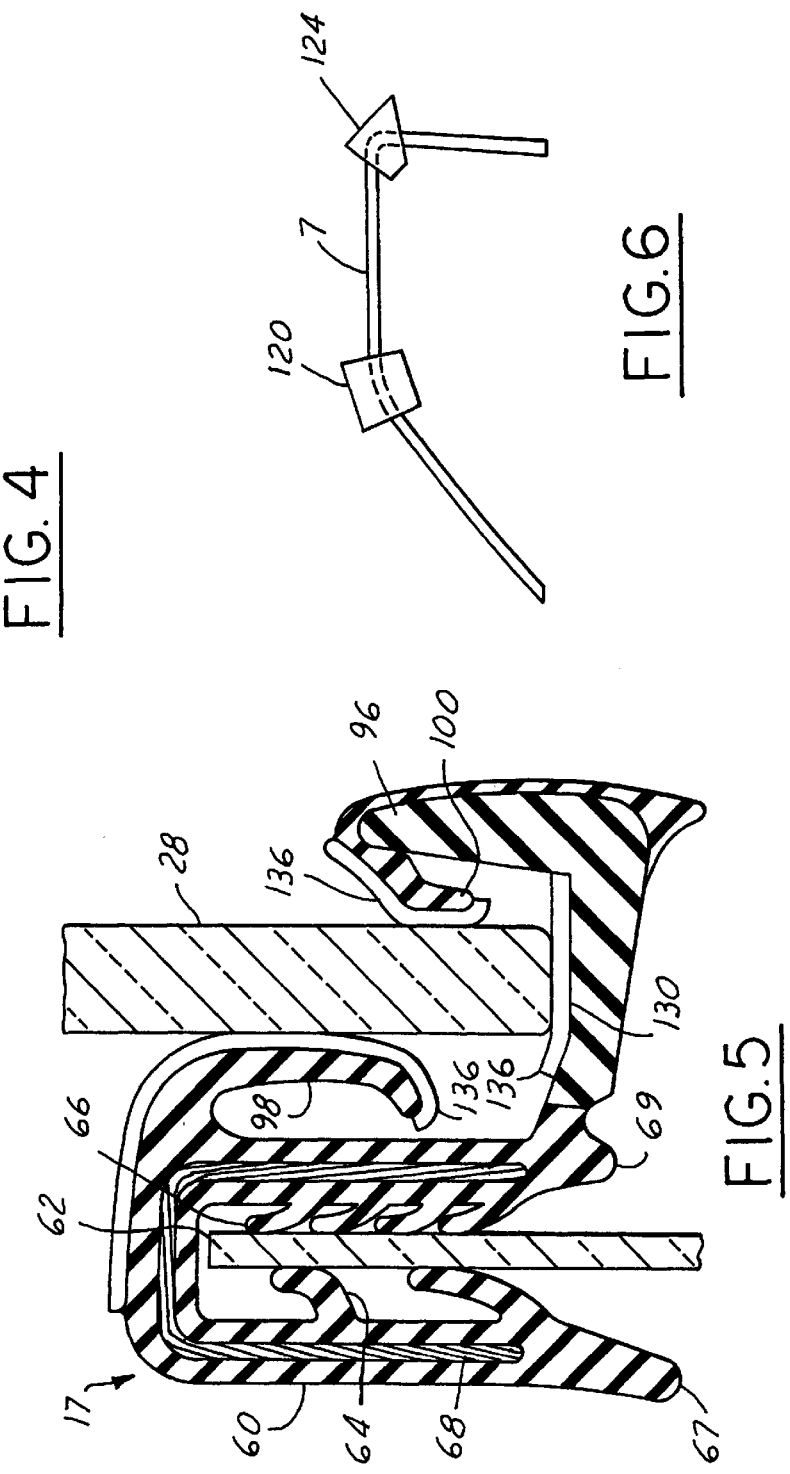

METHOD OF MAKING A VANISHING WARP CARRIER SEAL

FIELD OF THE INVENTION

The field of the present invention is that of seals. More particularly, the field of the present invention is that of seals commonly utilized in sealing the edges of glass in vehicle windows having extendable glass.

DESCRIPTION OF PRIOR DEVELOPMENTS

Most automotive doors have a body envelope created by two generally parallel spaced-apart inner and outer door panels. An extendable pane of window glass is nested between the door panels. A window regulator is provided for selectively moving the glass pane in and out of the door envelope to open and close the window opening of the door. In many vehicles, the vehicle door has on top a door window frame for enclosing the window. The door window frame has a seal typically called weather stripping which is connected with the door window frame to seal the lateral and upper edges of the window glass when the window glass is in its uppermost position.

A typical glass sealing weatherstrip seal has a U-shaped retention portion that contains a carrier and is installed over an edge of the sheet metal of the door window frame which abuts the window opening. Connected with the retention portion is a portion of the weather stripping referred to as the sealing member or the glass seal. The glass seal is typically shaped as an inverted U with respect to the retention portion and is laterally joined thereto. The glass seal will typically have flocked wings which seal the side of the glass when the glass is inserted within the U shape of the glass seal.

The carrier is typically reinforced by a roll formed thin metal member. Typical materials utilized for the carrier reinforcement are cold rolled steel, stainless steel and aluminum. After the carrier is roll formed it is passed through an extruder and covered with a polymeric material, typically an elastomeric material such as rubber. The interior of the retention portion will have formed barbs to cause it to retain itself to the sheet metal of the door once it is pushed over the edge of the sheet metal.

In most vehicles the lateral edge of a front door window frame at the front end is inclined due to the inclination of the A pillar. The door window frame, generally rearward of the A pillar, curves into a second horizontal linear section called the header which usually runs longitudinal with the vehicle. A third linear section of the door window frame is oriented generally vertically and is usually conformed to the shape of the B pillar. Between the A pillar and the top of the door window frame is a first curved section. Between the top of the door window frame and the B pillar portion of the window opening is a second curved section. Most carrier materials, which are thin metals, are not flexible enough to corner through the small radiuses of the curves of the door window frame. Therefore, prior to the present invention, a first length of weather stripping was utilized to seal the first linear section of the window. A second length of weather stripping was used to seal the second linear section of the window, and a third length of weather stripping was utilized to seal the third linear section. Many prior door windows required a molded joint between two linear sections for the curved sections. The molded joint had a dissimilar cross-section with the adjoining linear sections. Another method was to notch the carrier to allow it to fold and then mold a polymeric patch into the notched area. The prior sealing systems either did not provide a constant sectioned extrusion through the corners and therefore lacked retention to a seal mounting flange of the door window frame, or were limited to relatively large radiuses which would otherwise cause seal wrinkling or buckling. Lack of retention to the mounting flange or wrinkling or buckling can possibly contribute to sealing deficiencies. Typically, the molded corner is the area of greatest sealing difficulty. Also, without additional operations many molded corners lack the low friction areas between the window glass and seal. The lack of low friction causes squeaks and mandates that higher window regulator forces be utilized to ensure closure of the window.

In most instances, the metal used as the carrier within the extruded seal is not flexible enough to corner through the small radius required. Most carrier material that is flexible enough to corner through the small radius does not have the tensile strength required to process the carrier material through the roll forming mill.

It is desirable to provide a process which provides weather stripping that can be formed as one continuous member having linear and curved portions.

SUMMARY OF THE INVENTION

To meet the above-noted desire, the revelation of the present invention is brought forth. In a preferred embodiment, the present inventive process creates a seal having at least one linear portion connected with a second curved portion of weather stripping. The carrier section of the weather stripping includes a threaded metal wire having a warp fiber disposed thereon. The carrier section is formed into a predetermined cross-sectional shape using forming rollers. A polymeric material, typically an elastomeric substance such as rubber, is extruded around the carrier. Simultaneously, a contacting member is generated on the carrier to form a seal. The seal is heated within an oven to cure the polymeric material and to break down the fiber warp so that the seal is readily bendable. A predetermined second portion of the seal is heated in the forming device for a predetermined time at a predetermined temperature to cause the second portion of the seal to be formed in a curved manner.

Other features of the present inventive process can be discovered by a review of the accompanying drawings and detailed description of the preferred embodiment.

BRIEF DESCRIPTION OF THE DRAWINGS

FIG. 4 is a schematic view of the extrusion process utilized in the present inventive process.

FIG. 5 is a cross-sectional view of the weather stripping generated by the extrusion process shown in FIG. 4 after further processing.

FIG. 6 is a schematic view of the forming process utilized on the curved portions of the weather stripping shown in FIGS. 1–5.

DETAILED DESCRIPTION OF THE PREFERRED EMBODIMENT

Figure 1:
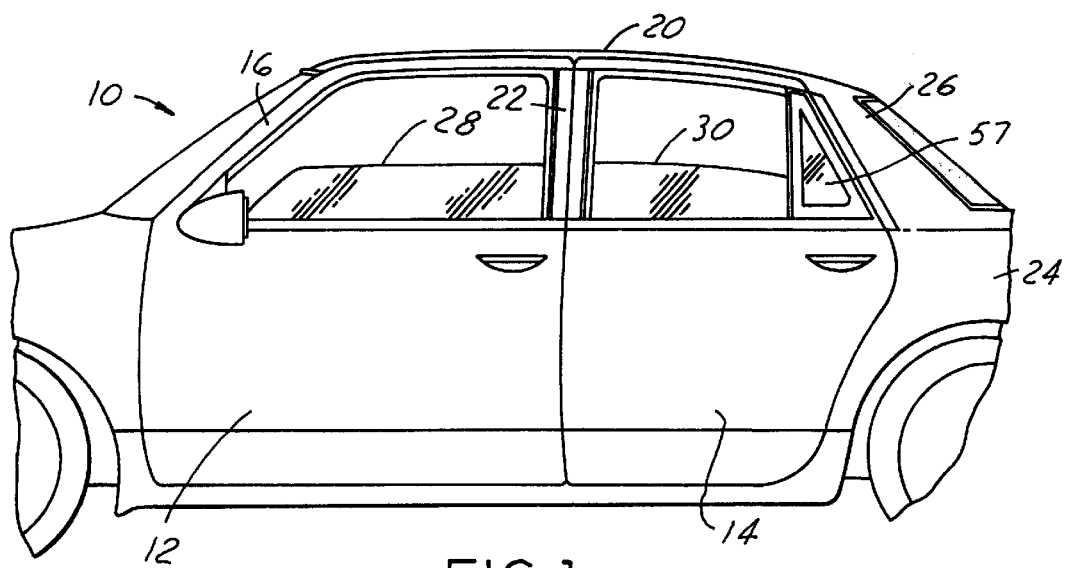
FIG. 1 illustrates an automotive sedan vehicle with front and rear doors with extendable window glass wherein the door windows are framed and utilize weather stripping manufactured according to the preferred embodiment process of the present invention.

FIG. 1 illustrates an automotive vehicle 10 with front and rear doors 12, 14. The automotive vehicle has an A pillar 16 which slopes rearwardly to the roof 20 concealed by a first linear portion of a door window frame. Separating the front and rear doors 12, 14 is a B pillar 22 which is partially concealed by a generally vertically extending linear portion of the door window frame. Joining the roof 20 to a rear quarter panel 24 is a C pillar 26. Stored within an envelope provided by the door 12 is an extendable window glass 28. The front door window frame encircles the window glass 28 in its uppermost position. The window frame extends along adjacent the A pillar, the roof and C pillar. The rear door 14 in like manner has a door window opening which is bordered by a door window frame.

Figure 2:
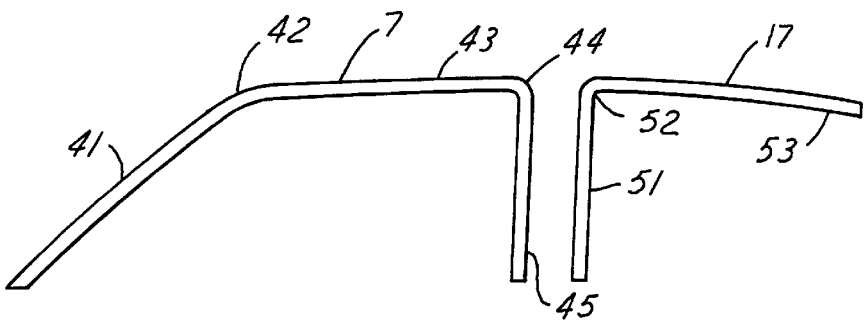
FIG. 2 is a front elevational view of weather stripping manufactured according to the present inventive process prior to installation in the door window frames illustrated in FIG. 1.

Referring additionally to FIG. 2, the weather stripping 7 which is placed in the front door frame and the weather stripping 17 which is placed in the rear door window frame, seal the extendable window glasses 28 and 30, respectively. The weather stripping 7 for the front door window opening has a first linear portion 41 joined to a second curved portion 42. The second curved portion is juxtaposed between the first linear portion which is positioned adjacent to the first portion 16 of the door window frame, and a third linear portion 43. A fourth curved portion 44 juxtaposes the third linear portion 43 and a fifth linear portion 45 which runs adjacent the B pillar. The weather stripping 17 in the rear door window frame has a first linear portion 51 which typically seals the window glass adjacent the B pillar, a second curved portion 52 and a third linear portion 53 which runs adjacent the roof. A rear linear portion of the window glass 30 is sealed by a portion of the molding system which also encompasses the rear quarter window 57 which is not considered part of this invention.

Figure 3:
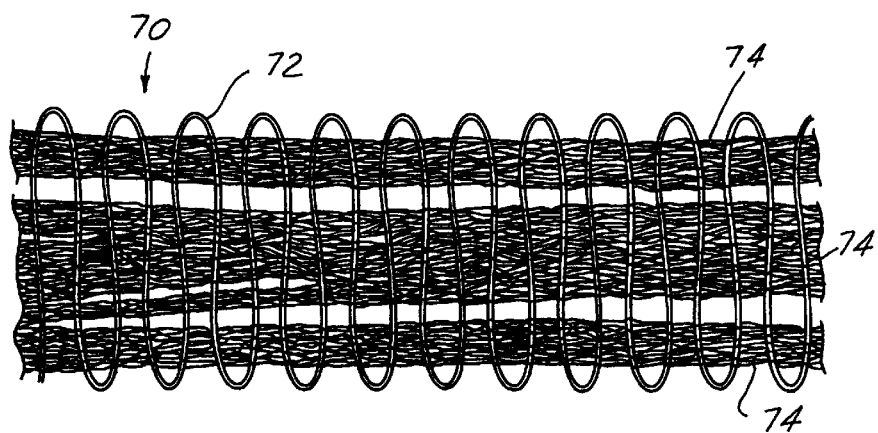
FIG. 3 is a view of the carrier before forming the weather stripping shown in FIGS. 1–2.

Referring additionally to FIGS. 3, 4, and 5, the weather stripping 7 has a U-shaped portion for retention 60 which is pressed down (as shown in FIG. 5) or pressed up (as shown in FIG. 1) upon the sheet metal edge 62 of the window frame. The retention 60 has legs 67 and 69. The length of the legs should be held to 10 to 30 mm. The retention legs 67 and 69 each has an interior portion with opposed barbs 64, 66 which engage upon the sheet metal and retain the weather stripping 7 to the sheet metal. The weather stripping 7 has a U-shaped reinforcement called a carrier 68. The carrier 68 is formed from a flat sheet material 70 provided by a woven wire 72. The wire 72 is woven in a serpentine manner. Interwoven into the wire 72 are fiber warps 74. The warps 74 are typically made from polypropylene or polyethylene. The material 70 is sometimes called a knitted wire reinforcement and the example 70 illustrated is manufactured by Hope Webbing Company. The material 70 is bent into the predetermined U-shaped cross-sectional form (FIG. 5) by a series of forming rolls 80. The carrier 68 has a minimum tensile strength of 150 lbs. for processing through the forming rolls. The carrier 68 then passes through an extruder 92. The extruder 92 encircles the carrier 68 with a polymeric material preferably an elastomer such as EPDM Rubber. Simultaneously, the interior barbs 64, 66 as illustrated in FIG. 5 are also formed. Adjacent to the carrier 68, a contacting member 96 will be generated by an inboard wing 98 and an outboard wing 100. The contacting member 96 has inner and outer wings 98, 100 which sealably contact the window glass 28 and forms a seal therewith. The extruder 92 is a dual material extruder. EPDM rubber with a durometer 70 (Shore A) is used in sections of the weather stripping 17 where sealing is important, as shown in FIG. 5 in the cross hatch area declining to the right. A harder EPDM rubber with a durometer 45 (Shore D) is used where shape retention is important, as shown in FIG. 5 in the cross hatch area ascending to the right.

Lower surfaces of the wings 98, 100 and a surface 130 of a pocket area have a flocking surface 136 applied thereto. To facilitate the application of flocking, adhesive is applied to the extrusion in adhesive booth 95. The extrusion then travels through a flocker 99. From the flocker 99, the extrusion travels through a series of in-line ovens 101 and is cured. The extrusion is then cooled in a water tank 104 and is thereafter presented to a cutter 111 that cuts the weather stripping 7 to the appropriate length.

The weather stripping 7 is then taken to forming molds 120, 124. The molds 120, 124 are opened up and the areas to be radiused 42, 44 are placed within the two molds 120, 124. The molds 120, 124 are heated to a range of 310° F. to 450° F., and preferably to 330° F. The weather stripping 7 is heated in molds 120, 124 for 1–5 minutes, preferably 2 minutes. The mold is then cooled. When the mold has cooled down to 130° F. or preferably to 120° F., the mold is opened and the weather stripping is removed. The total cycle time is approximately 8 minutes. The curved portions 42, 44 are checked on fixtures to verify proper radius set.

For best results, the radius of the radiused areas (curved portions) 42, 44 should be no smaller than 15 mm. The angle to which the radius extends should preferably be 105° or less. The corner shape in the weather stripping 7 will be set.

We claim:

1. A process for creating a seal having a first linear portion and a second curved portion joined thereto comprising:

providing a retaining section including a threaded metal wire with warp fiber disposed therein;

forming the threaded metal wire into a carrier section of predetermined cross-sectional shape using forming rolls;

extruding a polymeric material around the carrier section and generating a contacting member onto said carrier section to form a seal;

heating the seal within an oven to cure the polymeric material and to break down the warp fiber so that the seal is readily bendable; and heating then cooling the second portion of the seal in a forming device for predetermined times at predetermined temperatures to cause the second portion of the seal to be formed in a curved manner.

2. A process for creating a seal as described in claim 1, further including juxtaposing the second portion of the seal between linear first and third linear portions of the seal.

3. A process for creating a seal as described in claim 2, further including heating then cooling in a forming device for predetermined times at predetermined temperatures a fourth portion of the seal to cause the fourth portion to be formed in a curved manner.

4. A process for creating a seal as described in claim 1, further including cooling the seal after the seal has been heated in the oven to cure the polymeric material and to break down the fiber warp.

5. A process for creating a seal as described in claim 4, further including the process of water cooling the seal after the seal has been heated in the oven to cure the polymeric material and to break down the fiber warp.

6. A process for creating a seal as described in claim 1, wherein the seal is heated to 310° F. to 450° F. and wherein the seal is cooled below 130° F. by the forming device.

7. A process for creating a seal as described in claim 1, wherein the seal is heated to 330° F. and cooled to 120° F. by the forming device.

8. A process for creating a seal as described in claim 1, where the seal is heated in the forming device for one to five minutes.

9. A process as described in claim 8, where said mold heats said seal to 330° F. for two minutes and cools said seal for six minutes to a temperature of 120° F.

10. A process as described in claim 1, wherein said forming device bends said seal to an angle of 105° or less.

11. A process as described in claim 1, wherein said forming device bends said seal along a radius equal to or greater than 15 mm.

12. A process as described in claim 1, wherein said seal has a retention leg length between 10 and 30 mm. in length.

13. A process as described in claim 1, further including extruding two materials with different durometers to generate the seal.

14. A process as described in claim 13, wherein a first material is 70 durometer (Shore A) and the second material is 45 durometer (Shore D).

* * * * *